US010302233B2

(12) United States Patent
Reck et al.

(10) Patent No.: US 10,302,233 B2
(45) Date of Patent: May 28, 2019

(54) TEMPERATURE AND PRESSURE GAUGE ADAPTORS

(71) Applicant: NIBCO Inc., Elkhart, MI (US)

(72) Inventors: Michael Reck, Worcester, MA (US); Mark J. Roy, Worcester, MA (US); Andrew J. Terry, Worcester, MA (US)

(73) Assignee: NIBCO Inc., Elkhart, IN (US)

( * ) Notice: Subject to any disclaimer, the term of this patent is extended or adjusted under 35 U.S.C. 154(b) by 9 days.

(21) Appl. No.: 15/160,027

(22) Filed: May 20, 2016

(65) Prior Publication Data

US 2016/0363468 A1 Dec. 15, 2016

Related U.S. Application Data

(60) Provisional application No. 62/175,033, filed on Jun. 12, 2015.

(51) Int. Cl.
*F16L 41/00* (2006.01)
*G01L 19/00* (2006.01)
*G01D 11/30* (2006.01)

(52) U.S. Cl.
CPC ............ *F16L 41/008* (2013.01); *G01D 11/30* (2013.01); *G01L 19/003* (2013.01); *G01L 19/0007* (2013.01)

(58) Field of Classification Search
CPC ... G01L 19/0007; G01L 19/003; F16L 41/008
See application file for complete search history.

(56) References Cited

U.S. PATENT DOCUMENTS 2,494,654 A * 1/1950 Glynn ..................... F22B 1/284
220/567.3
2,695,753 A * 11/1954 Kirk, Jr. ................ F24D 3/1008
138/30
(Continued)

FOREIGN PATENT DOCUMENTS

EP 0086089 8/1983
GB 882605 11/1961
(Continued)

OTHER PUBLICATIONS

Sioux Chief: "Catalog 2007," Dec. 2007 (www.rsdale.com/wp-content/uploads/2011/02/SIOUX-CHIEF.pdf).
(Continued)

*Primary Examiner* — Paul M. West
(74) *Attorney, Agent, or Firm* — Price Heneveld LLP

(57) ABSTRACT

A gauge adaptor apparatus allows easy connection and removal of a gauge to a hydronic system or other fluidic piping system for taking a pressure or temperature reading. The gauge adaptor apparatus is compatible with standard hose connections and can be used to quickly and easily add a gauge onto a hydronic system without requiring extensive labor and without needing to halt the operation of the system. Gauge adaptor apparatuses can be used to take one-time readings, or they can be left permanently installed for ongoing readings of the system. Gauge adaptor apparatuses take up little space, are highly compatible with existing fluid valves and system configurations, can be installed quickly and easily without requiring much labor, and can be easily removed for system draining, servicing, or replacement.

8 Claims, 15 Drawing Sheets

(56) References Cited

U.S. PATENT DOCUMENTS

| | | | |
|---|---|---|---|
| 3,008,686 A * | 11/1961 | Becker | F16K 24/04 |
| | | | 251/320 |
| 3,207,179 A | 9/1965 | Klagues | |
| 3,963,177 A * | 6/1976 | Frank | G05D 23/125 |
| | | | 236/37 |
| 5,760,296 A | 6/1998 | Wilson | |
| 5,895,861 A * | 4/1999 | Slonaker | G01K 5/38 |
| | | | 374/143 |
| 6,655,412 B2 | 12/2003 | Reck | |
| 6,779,561 B2 | 8/2004 | Reck | |
| 7,621,295 B2 | 11/2009 | Reck | |
| 7,631,662 B2 | 12/2009 | Reck | |
| 7,681,596 B2 | 3/2010 | Reck | |
| 7,789,106 B2 | 9/2010 | Reck | |
| 7,857,002 B2 | 12/2010 | Reck | |
| 8,316,886 B2 | 11/2012 | Olsen et al. | |
| 8,770,223 B2 | 7/2014 | Reck | |
| 2003/0230148 A1 | 12/2003 | Saxton | |
| 2013/0008542 A1* | 1/2013 | Irwin | F16K 31/402 |
| | | | 137/859 |

FOREIGN PATENT DOCUMENTS

| | | |
|---|---|---|
| GB | 2239529 | 7/1991 |
| JP | 2009192242 | 8/2009 |

OTHER PUBLICATIONS

Wattsradiant: "Hydronex installation ands Operations Manual," Sep. 2008 (www.pexheat.com/site/download/ph_Hydro_nex-Manual.pdf).

Legendhydronics—Legend Valve: "M-8200 Precision manifold—Installation Guide," Apr. 2014 (www.legendhydronics.com/media/L-H-M-8200_IST%20(4-14).pdf).

* cited by examiner

TEMPERATURE AND PRESSURE GAUGE ADAPTORS

CROSS-REFERENCE TO RELATED APPLICATION

This application claims the benefit of and priority to U.S. Provisional Patent Application Ser. No. 62/175,033, filed Jun. 12, 2015, the contents of which are incorporated herein by reference in their entirety.

FIELD OF THE INVENTION

The invention generally relates to hydronic systems, and more specifically to gauge adaptors for connecting a gauge to a hydronic system for taking pressure or temperature readings from the system.

BACKGROUND

Hydronic heating and cooling systems have gained popularity due to the comfortable average temperature they provide and uniformity in heating. Hydronic systems use water, or water-based solutions, to move thermal energy from where it is produced to where it is needed. Thermal energy is absorbed by the water at a heat source, conveyed by the water through the distribution piping, and finally released into a heated space by a heat emitter.

During use, different parts of a hydronic system will experience fluctuations in pressure or temperature. Monitoring pressure and temperature at various locations and time intervals is needed for controlling the heating output of the system and for regular system maintenance to ensure proper function and efficiency. The use of purge valves, for example, can lead to pressure differentials that can affect the operation of the system.

Hydronic systems typically have gauges built in to a boiler unit to provide temperature or pressure readings. These can take up much space and involve additional piping. Failure of a gauge may require replacement of an entire boiler or involve extensive maintenance and significant system downtime. Also, such gauges may not provide an accurate view of the overall system operation, since temperature and pressure may vary throughout the system.

SUMMARY

The present disclosure provides easily connectable and removable gauge adaptor apparatuses that can connect a gauge to a hydronic system or other fluidic piping system for taking a pressure or temperature reading. The gauge adaptor apparatus is compatible with standard hose connections and can be used to quickly and easily add a gauge onto a hydronic system without requiring extensive labor and without needing to halt the operation of the system. Apparatuses of the present disclosure can be temporarily added to a hydronic system while in operation to take a one-time reading from the gauge, or the gauge adaptor apparatus can be permanently installed for ongoing temperature or pressure readings. The disclosed gauge adaptor apparatuses take up little space, are highly compatible with existing fluid valves and system configurations, can be installed quickly and easily without requiring much labor, and can be easily removed for system draining, servicing, or replacement.

Gauge adaptor apparatuses of the present invention generally include a gauge adaptor apparatus body with a fluid channel running therethrough. At one end of the fluid channel is a valve fitting that is generally compatible with standard drain valves, such as ¾" fittings. At another end of the fluid channel is a gauge fitting configured to receive a temperature gauge, a pressure gauge, or a combination temperature and pressure gauge. The fluid channel is also typically in fluid communication with a bleeder, which can be used to bleed pressure from the apparatus, such as during removal of the apparatus.

To connect the gauge adaptor apparatus to a hydronic piping system, the apparatus includes a valve fitting typically such as a threaded union fitting. The gauge adaptor apparatus is thus compatible with existing fluid systems that include a drain valve or port. The fitting can be threaded onto a drain other external connection of a valve. Typically the fitting is connected while flow to the drain is off, or the valve is otherwise in an unpressurized condition. The fitting opens up to a fluid channel that runs through the apparatus. Once connected, the valve can be turned on to direct fluid to the drain valve and to the gauge adaptor apparatus, thereby to incorporate the gauge adaptor apparatus into the fluidic system. When so connected, the fluid channel of the gauge adaptor apparatus is thereby in fluid communication with the hydronic system. The gauge is configured to take readings from the fluid channel of the apparatus. When connected to the hydronic system, the gauge can thus take a pressure reading and/or a temperature reading of the system.

For removal of the gauge adaptor apparatus from the system, fluid is diverted away from the drain valve, and therefore away from the gauge adaptor apparatus. Residual fluid and pressure in the fluid channel can be released via a bleeder. When the pressure returns to ambient levels, the adaptor can be easily disconnected from the hydronic system.

In certain aspects, the invention includes an apparatus connecting a gauge to a hydronic system. The apparatus includes a body defining a flow channel, a union fitting at one end of the flow channel connectable to a drain valve of a hydronic system, a bleeder valve in fluid communication with the flow channel, and a gauge fitting in fluid communication with the flow channel, wherein the gauge fitting is configured to connect with a gauge. The union fitting may be a ¾" threaded female union fitting, and it may further include a gasket, o-ring, or washer for creating a seal between the body and the drain valve. The bleeder valve can be configured to bleed fluid from the flow channel. The bleeder valve may include a bleeder cap and a gasket, o-ring, or washer for creating a seal between the body and the bleeder cap.

In some embodiments, the gauge includes a pressure gauge. In some embodiments, the gauge further includes a temperature gauge. The gauge may include a temperature probe configured to fit inside the flow channel. The gauge fitting may be a ¼" NPT threaded female fitting.

In related aspects, the invention includes a method for taking a reading from a hydronic system. The method includes providing a gauge adaptor apparatus. The gauge adaptor apparatus includes a body defining a flow channel, a union fitting at one end of the flow channel connectable to a drain valve of a hydronic system, a bleeder valve in fluid communication with the flow channel, a gauge fitting in fluid communication with the flow channel, and a gauge connected to the gauge fitting. The method further includes connecting the union fitting to a drain valve of a hydronic system having a fluid flow, directing the fluid flow to the drain valve to incorporate the gauge adaptor apparatus into the hydronic system, and taking a reading from the gauge.

The union fitting comprises a ¾" threaded female union fitting. The union fitting may further include a gasket, o-ring, or washer for creating a seal between the body and the drain valve. The bleeder valve comprises a bleeder cap and a gasket, o-ring, or washer for creating a seal between the body and the bleeder cap.

In certain embodiments, the gauge is a pressure gauge and the reading is a pressure reading. In certain embodiments, the gauge further includes a temperature gauge and the reading further includes a temperature reading. The gauge may include a temperature probe configured to fit inside the flow channel.

In some embodiments, the method further includes removing the gauge adaptor apparatus from the hydronic system by diverting fluid flow from the drain valve, using the bleeder to bleed fluid from the flow channel, and disconnecting the union fitting from the drain valve.

DETAILED DESCRIPTION

The present disclosure involves gauge adaptor apparatuses for connecting a temperature or pressure gauge to a hydronic or other fluidic system. The apparatus is configured to be connectable to a standard drain valve, such as a ¾" threaded hose drain connection. In that sense, the apparatus is interchangeable and movable between different hydronic systems or different locations within a system. The apparatus can be used as a portable tool for quickly taking a temperature or pressure reading from an unoccupied drain valve. In other uses, the apparatus can be installed as a permanent fixture on a hydronic system for taking pressure or temperature readings during normal use of the system.

Apparatuses of the invention are particularly useful with hydronic systems. Hydronic systems utilize a liquid fluid to shift energy (i.e. BTUs) from one location to another. Typically this is accomplished by heating up (or in cooling applications, cooling) a liquid, such as water, or a mixture of water and other fluids (such as glycol antifreeze) to elevate the boiling point and lower the freezing point, and pumping the liquid to another location where the captured energy in the fluid is released. The hydronic solution can be heated through the use of a boiler, solar energy, geothermal pump, or any other means. The hydronic solution can be cooled by use of a heat pump, geothermal pump, or other such means of cooling the solution.

For both maintenance and in the regular operation of a hydronic system, it may be necessary to take readings to determine the pressure or the temperature in different parts of the system. The invention therefore involves gauge adaptor apparatuses that can be added to an existing hydronic system using a standard hose connection. Apparatuses of the invention can be quickly and conveniently added to any standard hose connection and use that connection as a gauge port. The adaptor can be installed temporarily, for example to take a one-time reading, or it can be permanently installed. Apparatuses of the invention can be configured to connect a pressure gauge, a temperature gauge, or a combination of both. The apparatuses can fit with bottom or center back mounted gauges.

Figure 1:
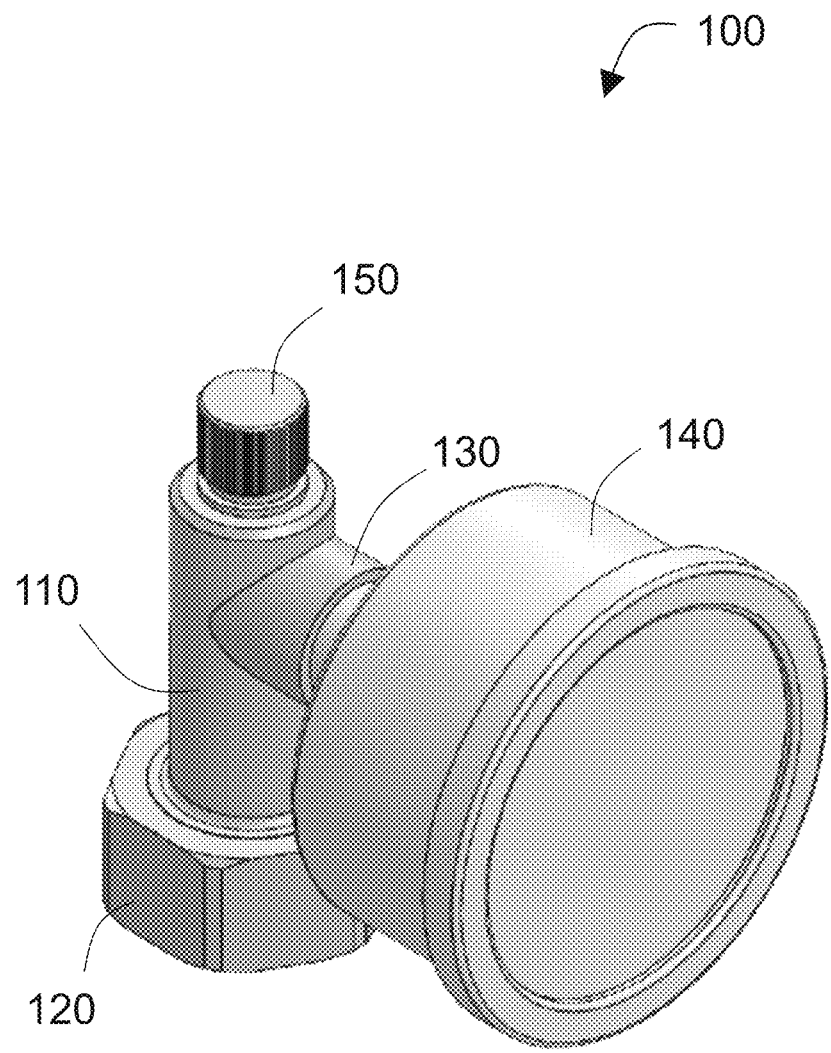
FIG. 1 shows a perspective view of a gauge adaptor apparatus with a pressure gauge.

FIG. 1 shows an embodiment of a gauge adaptor apparatus 100 of the invention. The apparatus 100 includes a body 110, which defines a flow channel (not visible) therein. The body 110 is made of a resilient material suitable for plumbing such as brass. At a proximal end of the body 110 is a union fitting 120 which can connect to a hose drain connection of a hydronic system (not shown). The union fitting 120 can be for example a ¾" union hose drain adaptor. When connected, flow channel of the apparatus 100 is in fluid communication with the hydronic system. The body 110 also includes a gauge fitting 130 for connecting a gauge 140 to the body 110. One branch of the flow channel runs through the gauge fitting 130 so that when the gauge 140 is connected, the gauge 140 can take a pressure reading from inside the flow channel. Also in fluid communication with the flow channel is a bleeder valve, covered by a bleeder cap 150. The bleeder cap 150 can be activated to release pressure from inside the flow channel.

Figure 2:
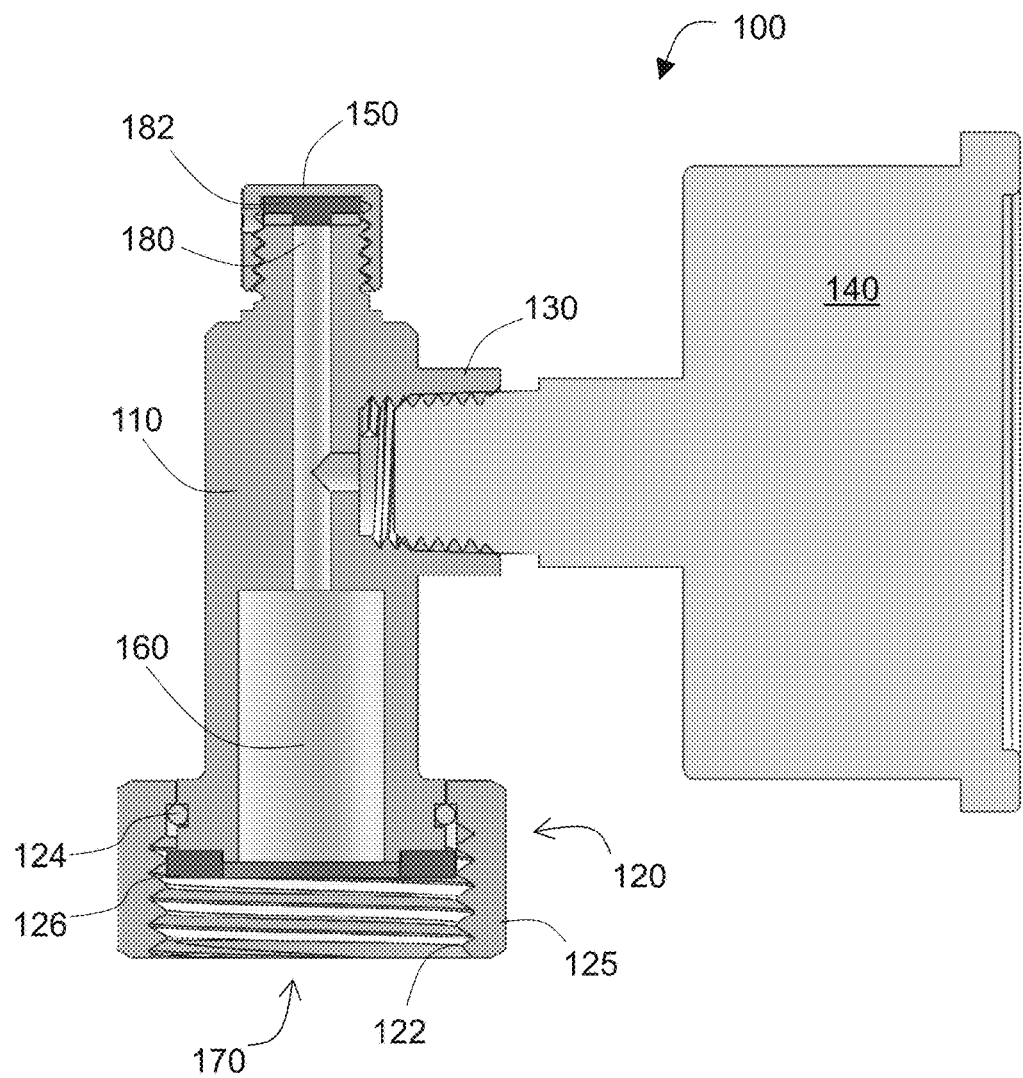
FIG. 2 shows a cross-section view of a gauge adaptor apparatus with a pressure gauge.

FIG. 2 shows a cross section of the apparatus 100. The flow channel 160 extends from a drain connection port 170 at a proximal end of the body 110. The union fitting 120 includes a union nut 125 with threads 122 for connecting to a hose drain. The threads 122 can be, for example, ¾" female thread. The union fitting 120 includes a snap ring 124 made of steel or another similar material. A washer 126 is located inside the union thread nut 125 for creating a seal between the body 110 and the hose drain when connected. The washer 126 can be made of a rubber material such as EPDM or other elastomeric materials known in the art.

At a distal end of the flow channel 160 is the bleeder valve 180 covered by the bleeder cap 150, which may be made of brass or other metal. A gasket 182 creates a seal between the body 110 and the bleeder cap 150. The gasket 182 can be made of a rubber material such as EPDM or other elastomeric materials known in the art. To bleed pressure from the fluid channel 160, the bleeder cap can be twisted, or in some embodiments pushed in. The flow channel 160 also is in fluid communication with the gauge 140. The gauge 140 can be a pressure gauge and is connected to the body 110 via the threaded gauge fitting 130. The gauge fitting 130 can include a gasket or o-ring (not shown). The fitting 130 can have, for example, a ¼" NPT female thread for receiving a pressure gauge 140.

Figure 3:
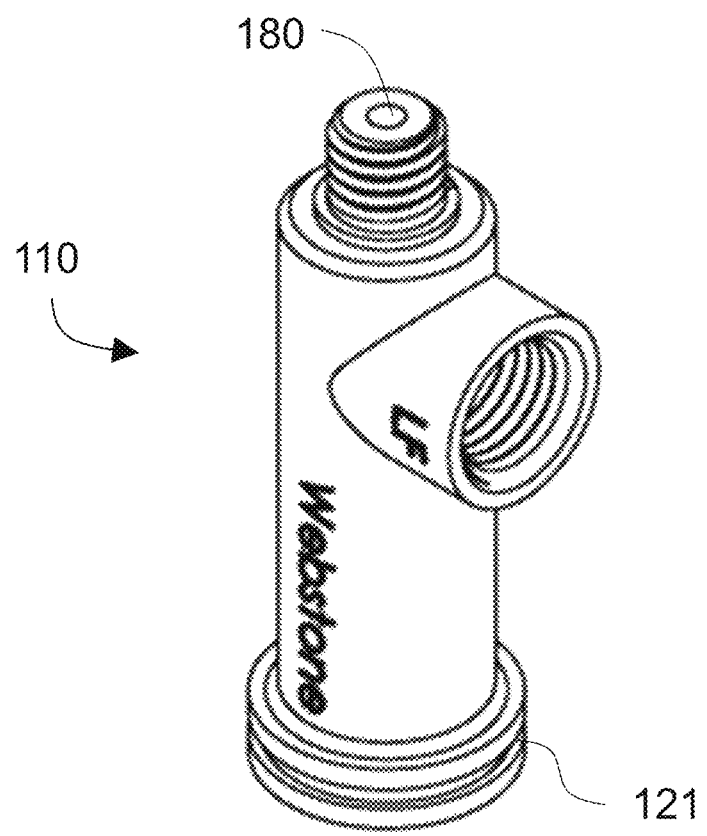
FIG. 3 shows a perspective view of the body of a gauge adaptor apparatus.
Figure 4:
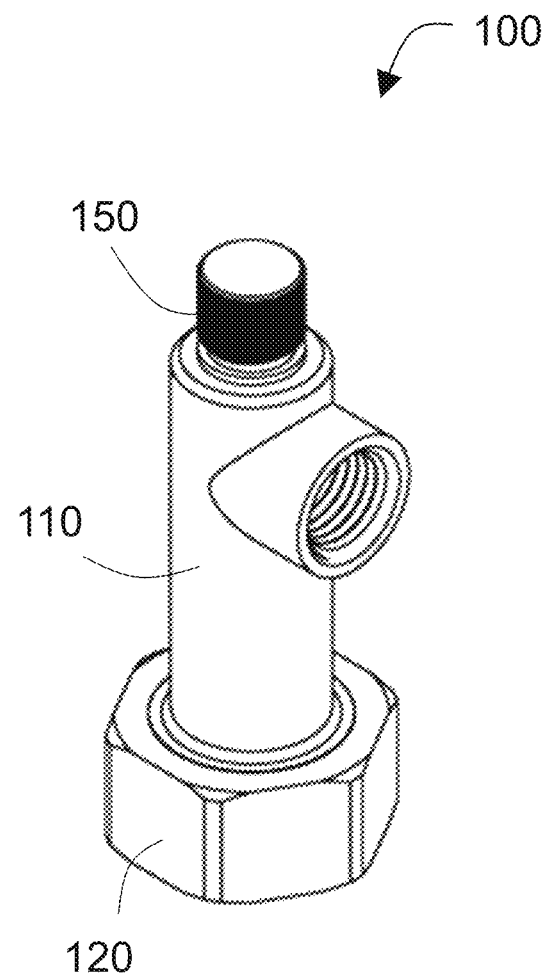
FIG. 4 shows a perspective view of a gauge adaptor apparatus.

FIG. 3 shows the body 110 of apparatus 100. The bleeder cap 150 is removed to show the threading and the opening of the bleeder valve 180. The gauge 140 is removed to show the threading of the gauge fitting 130. The union thread nut 125 is removed to show the groove 121 where the snap ring 124 can be seated. The union thread nut 125 as shown in FIG. 2 has a lip that fits over the snap ring 124 to hold the union thread nut 125 in place, while allowing it to rotate. FIG. 4 shows another view of the apparatus 100 assembled with the bleeder cap 150 and the union fitting 120 in place.

Figure 5:
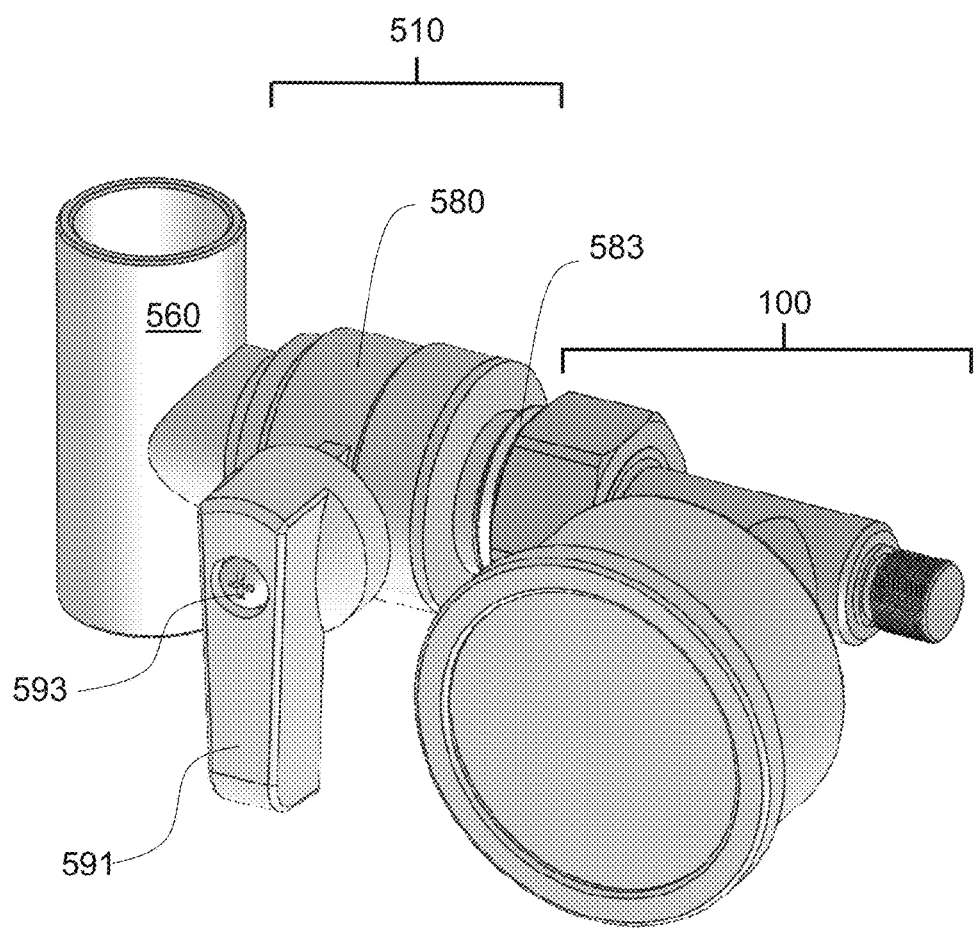
FIG. 5 shows a perspective view of a gauge adaptor apparatus installed on a drain valve.

FIG. 5 shows the apparatus 100 connected to a drain valve 510 of a hydronic system. The drain valve includes a drain/venting valve portion 580 extending from a valve body 560. The drain/venting valve portion 580 includes a drain port 583 with a male threaded portion (not shown) receivable within the union fitting 120. A purge valve handle 591 is connected to a purge valve flow diversion device (not shown) via a purge valve actuator (not shown). The flow diversion device can be a ball valve or other similar valve, as would be known in the art. The purge valve handle 591 is retained to the purge valve actuator by a screw 593. The purge valve handle 591 enables a first and second position of the purge valve flow diversion device. In one position, flow is diverted away from the drain/venting valve portion 580, and in another position, flow is directed to the drain/venting valve portion 580.

The apparatus 100 can be threaded onto existing drain products, such as the valves sold under the trademarks Isolator®, Hydro-Core™, and Purge & Fill™ and made by Webstone Company, Inc. (Worcester, Mass.), and including the valves described in U.S. Pat. Nos. 6,655,412; 6,779,561; 7,621,295; 7,631,662; 7,681,596; 7,789,106; 7,857,002; 8,316,886; and 8,770,223, incorporated herein by reference in their entirety. An apparatus with a ¾" hose thread union connector can be used with any product having a compatible ¾" drain valve. When connected to a fluidic system, the gauge provides a reading of the pressure inside the system.

To connect the apparatus 100, the union fitting is threaded onto a drain valve while the valve is in the "off" position, i.e., when fluid is not flowing to the drain port. After the apparatus is threaded onto a hose drain connection of a hydronic system, the drain valve (such as a ball valve) can be actuated, allowing fluid to flow to the gauge and thereby introducing the pressure gauge into the system. The gauge would then output a pressure that is currently in the system.

The apparatus can either be left in the system to constantly provide a pressure reading, or the apparatus can be removed once again. To remove the apparatus, the drain valve is first closed to isolate the gauge adaptor apparatus from the rest of the system. To release the residual pressure inside the flow channel of the apparatus, the bleeder valve can be actuated. Once the pressure is relieved from the flow channel, the apparatus can be safely removed from the drain. The cap on the drain may then be threaded back into place.

The gauge adaptor apparatus can include a pressure gauge, a temperature gauge, or a combination of both.

Figure 6:
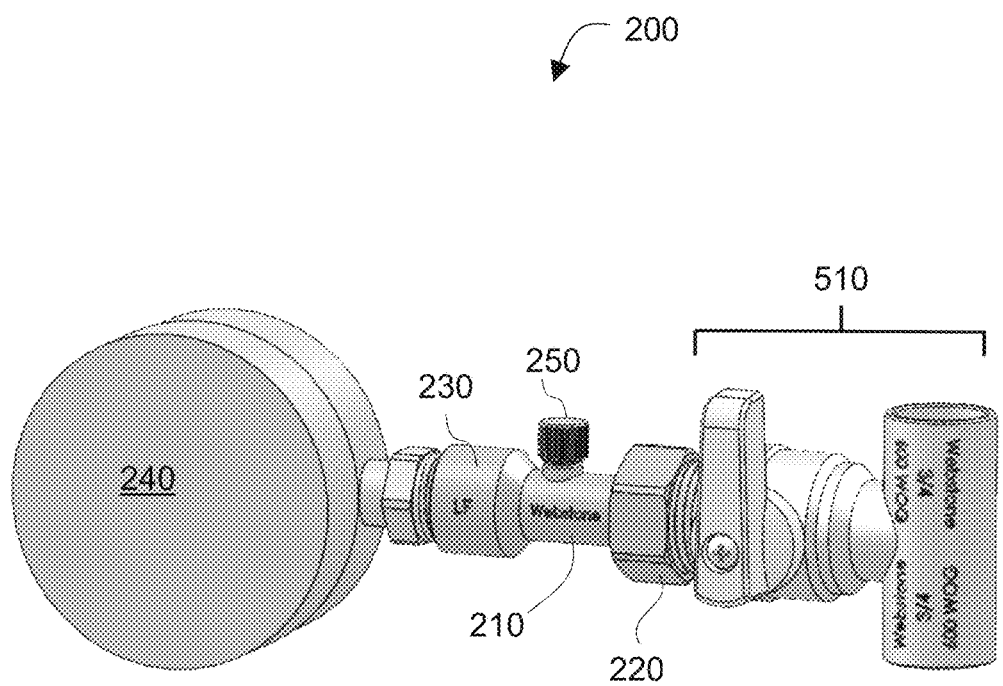
FIG. 6 shows a view of a gauge adaptor apparatus with a combination pressure and temperature gauge installed on a drain valve.

FIG. 6 shows a gauge adaptor apparatus 200 with a combination pressure and temperature gauge and a union hose drain adaptor. The apparatus 200 operates in substantially the same way as apparatus 100. The apparatus 200 includes a body 210, which defines a flow channel (not visible) therein. The body 210 is made of a resilient material suitable for plumbing such as brass. At a proximal end of the body 210 is a union fitting 220 which can connect to a hose drain connection 510 of a hydronic system. The union fitting 220 can be for example a ¾" union hose drain adaptor. When connected, flow channel of the apparatus 200 is in fluid communication with the hydronic system. The body 210 also includes a gauge fitting 230 for connecting a gauge 240 to the body 210. The gauge can be a pressure gauge, a temperature gauge, or both. One branch of the flow channel runs through the gauge fitting 230 so that when the gauge 240 is connected, the gauge 240 can take a pressure or temperature reading from inside the flow channel. Also in fluid communication with the flow channel is a bleeder valve, covered by a bleeder cap 250. The bleeder cap 250 can be activated to release pressure from inside the flow channel.

FIG. 6 shows a cross section of the apparatus 200. The flow channel 260 extends from a drain connection port 270 at a proximal end of the body 210. The union fitting 220 includes a union nut 225 with threads 222 for connecting to a hose drain 510. The threads 222 can be, for example, ¾" female thread. The union fitting 220 includes a snap ring 224 made of steel or another similar material. A washer 226 is located inside the union thread nut 225 for creating a seal between the body 210 and the hose drain 510 when connected. The washer 226 can be made of a rubber material such as EPDM or other elastomeric materials known in the art.

A bleeder valve 280 is in fluid communication with the flow channel 260. The bleeder valve 280 covered by the bleeder cap 250, which may be made of brass or other metal. A gasket 282 creates a seal between the body 210 and the bleeder cap 250. The gasket 282 can be made of a rubber material such as EPDM or other elastomeric materials known in the art. To bleed pressure from the fluid channel 260, the bleeder cap 282 can be twisted, or in some embodiments pushed in. The flow channel 260 also is in fluid communication with the gauge 240. The gauge 240 is a combination pressure and temperature gauge. The gauge 240 includes a temperature probe 245, which fits axially within the flow channel 260 and extends through the drain connection port 270. When the apparatus 200 is connected to the hose drain 510, the temperature probe 245 is positioned to take a temperature reading from within the hose drain 510. The gauge 240 is connected to the body 210 via the threaded gauge fitting 230. The gauge fitting 230 can include a gasket or o-ring (not shown). The fitting 230 can have, for example, a ¼" NPT female thread for receiving a pressure gauge 140.

The hose drain 510 is part of a hydronic system and is operably connected to a flow diversion device 503 which controls flow to the hose drain 510 from the valve body 560. The flow division device 503 is shown in its closed position in which fluid in the system is prevented from flowing from the valve body 560 to the drain port 583. In this illustrative embodiment, the flow diversion device 503 is a ball valve. The ball 541 has a through hole 543 extending through its center. The ball 541 is rotatable on an axis of the purge valve actuator (not shown) which extends through its center and normal to the plane of drawing in FIG. 7 by movement of purge valve handle (not shown, but similar to the handle shown in FIG. 10) and the purge valve actuator retained thereto. The ball forms a seal with sealing portions 548.

Figure 7:
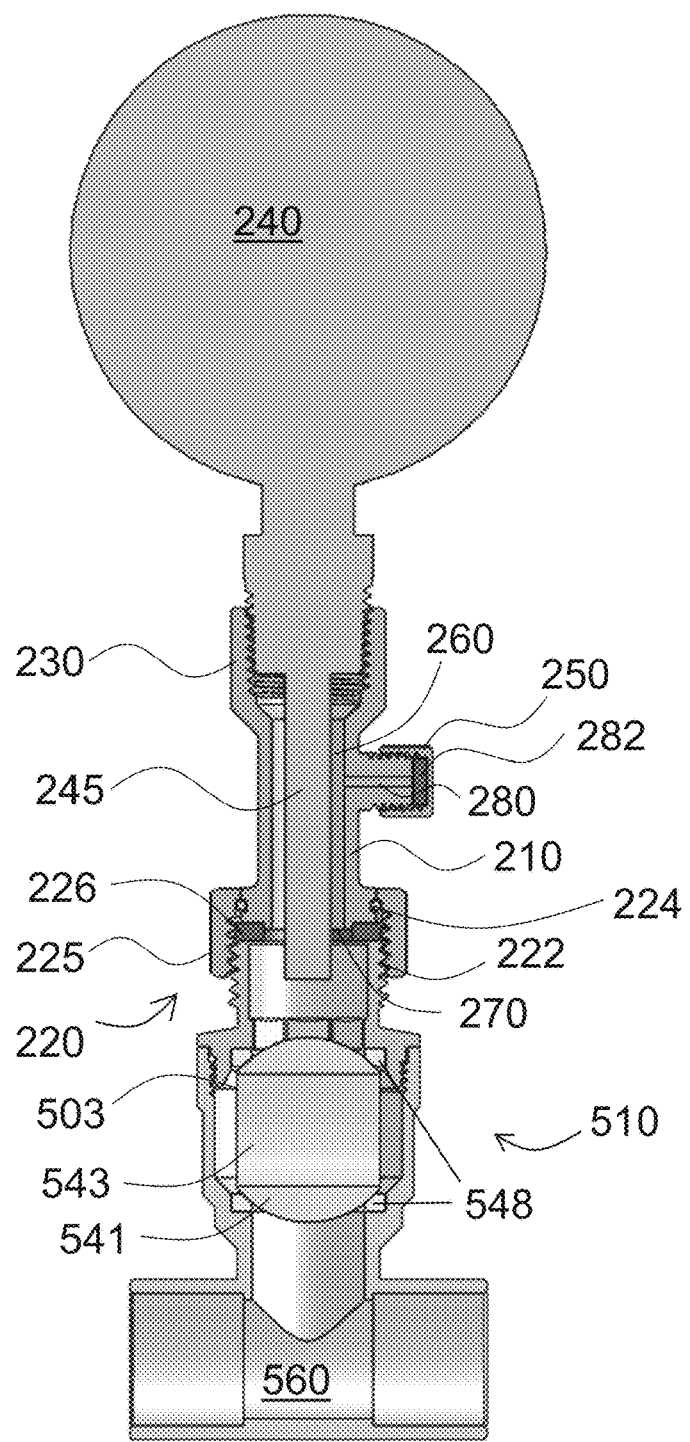
FIG. 7 shows a cross-section view of a gauge adaptor apparatus with a combination pressure and temperature gauge installed on a drain valve.
Figure 8A:
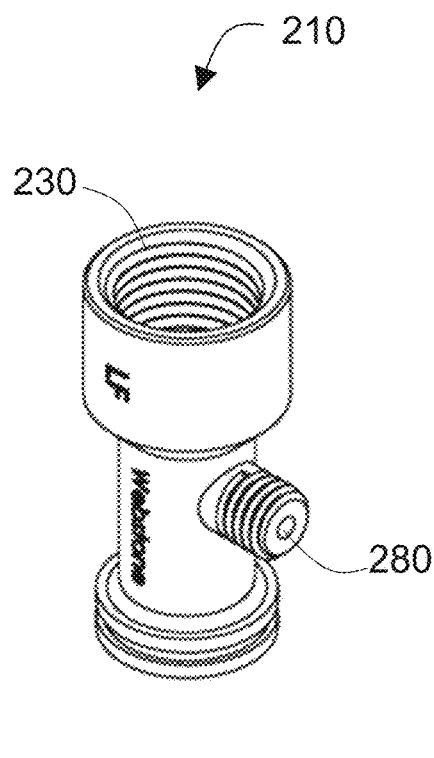
FIG. 8A shows a perspective view of the body of a gauge adaptor apparatus.
Figure 8B:
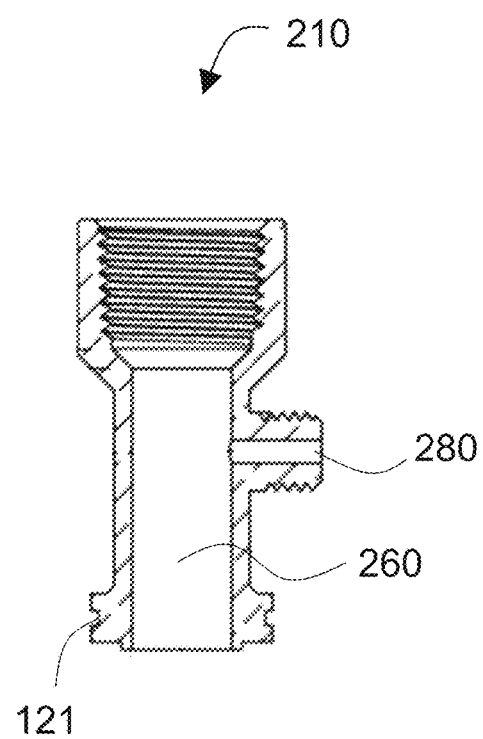
FIG. 8B shows a cross-section view of the body of gauge adaptor apparatus.

FIGS. 8A and 8B show a perspective view and a cross-section view of the body 210 of apparatus 200. The bleeder cap 250 is removed to show the threading and the opening of the bleeder valve 280. The gauge 240 is removed to show the threading of the gauge fitting 230. The union thread nut 225 is removed to show the groove 221 where the snap ring 224 is seated when fully assembled. The union thread nut 225 as shown in FIG. 7 has a lip that fits over the snap ring 224 to hold the union thread nut 225 in place, while allowing it to rotate.

Figure 9:
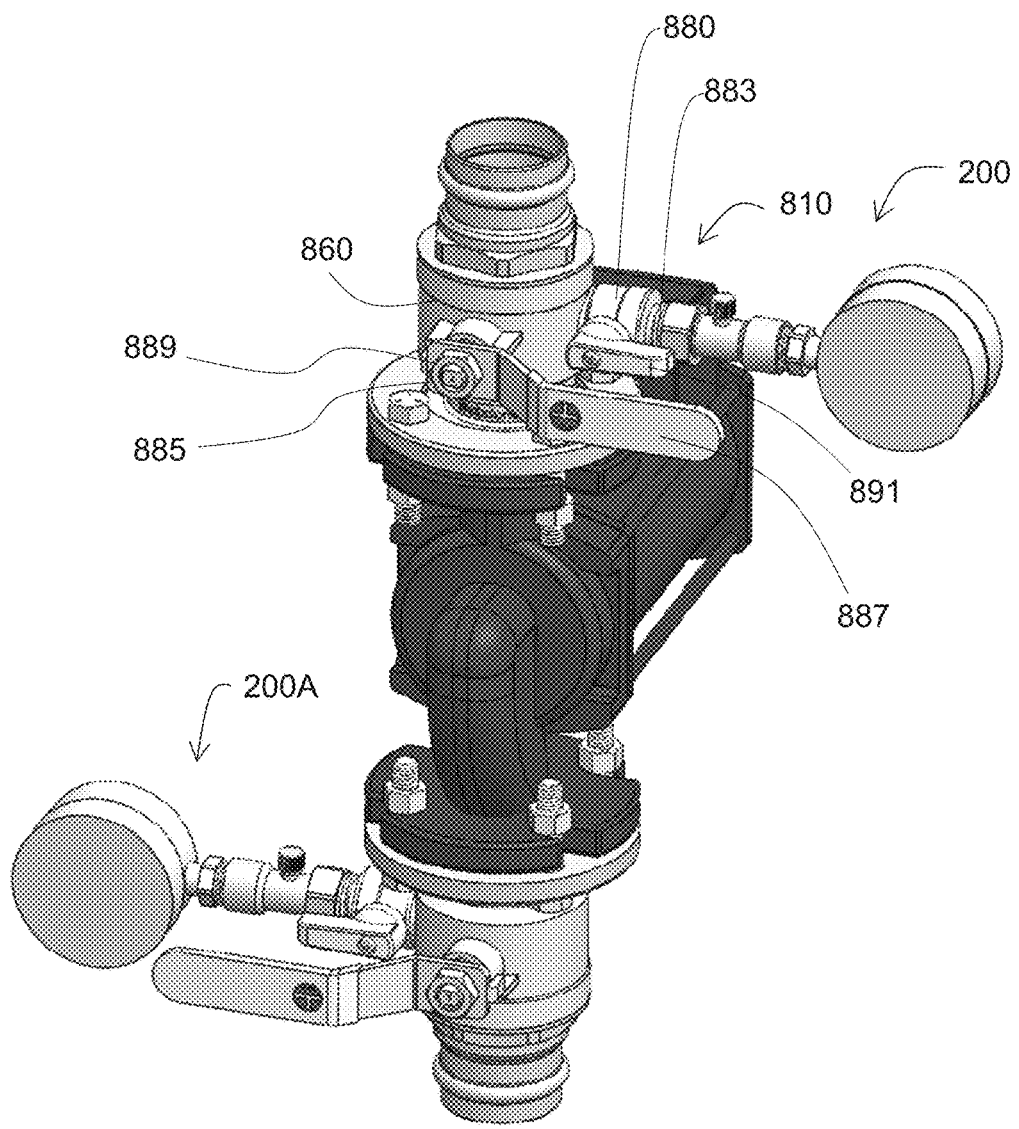
FIG. 9 shows gauge adaptor apparatuses with combination pressure and temperature gauges installed on drain valves of a hydronic system.

FIG. 9 shows two gauge adaptor apparatuses 200 and 200A attached to a hydronic system. Both apparatuses 200 and 200A are substantially the same, and so only apparatus 200 will be described herein. Apparatus 200 is connected to a drain valve 810 of a hydronic system. The drain valve 810 includes a drain/venting valve portion 880 extending from a valve body 860. The drain/venting valve portion 880 includes a drain port 883 with a male threaded portion (not shown) receivable within the union fitting 220 of the apparatus 200. A purge valve handle 891 is connected to a purge valve flow diversion device (not shown) via a purge valve actuator (not shown). The flow diversion device can be a ball valve or other similar valve, as would be known in the art. The purge valve handle 891 is retained to the purge valve actuator by a screw. The purge valve handle 891 enables a first and second position of the purge valve flow diversion device. In one position, flow is diverted away from the drain/venting valve portion 880, and in another position, flow is directed to the drain/venting valve portion 880. A main actuator 885 extends from the valve body 860 enabling a first and second position of the main valve flow diversion device (not shown here). The main valve flow diversion device is connected to a main handle 887 via the main actuator 885. The main handle 887 is retained to the main actuator with a nut 889.

The apparatus 200 can be threaded onto existing drain products, such as the valves sold under the trademarks Isolator®, Hydro-Core™, and Purge & Fill™ and made by Webstone Company, Inc. (Worcester, Mass.), and including the valves described in U.S. Pat. Nos. 6,655,412; 6,779,561; 7,621,295; 7,631,662; 7,681,596; 7,789,106; 7,857,002; 8,316,886; and 8,770,223, incorporated herein by reference in their entirety. An apparatus with a ¾" hose thread union connector can be used with any product having a compatible ¾" drain valve. When connected to a fluidic system, the gauge provides a reading of the pressure and temperature inside the system.

To connect the apparatus 200, the union fitting is threaded onto a drain valve while the valve is in the "off" position, i.e., when fluid is not flowing to the drain port. After the apparatus is threaded onto a hose drain connection of a hydronic system, the drain valve (such as a ball valve) can be actuated, allowing fluid to flow to the gauge and thereby introducing the combination temperature and pressure gauge into the system. The gauge would then output a temperature and pressure that is currently in the system.

The apparatus can either be left in the system to constantly provide temperature and pressure readings, or the apparatus can be removed once again. To remove the apparatus, the drain valve is first closed to isolate the gauge adaptor apparatus from the rest of the system. To release the residual pressure inside the flow channel of the apparatus, the bleeder valve can be actuated. Once the pressure is relieved from the flow channel, the apparatus can be safely removed from the drain. The cap on the drain may then be threaded back into place.

The apparatus can be attached to standard hose connections, such as drain valves. A drain valve may include a ball valve for prohibiting or directing flow to the drain.

One of the benefits of the gauge adaptor apparatuses described herein is their compatibility with a wide variety of valves. They can be connected to t-drains, ball drains, union ball drains, expansion tank ball drains, any ball valve with a hose end, or any product generally with a compatible hose drain.

Figure 10:
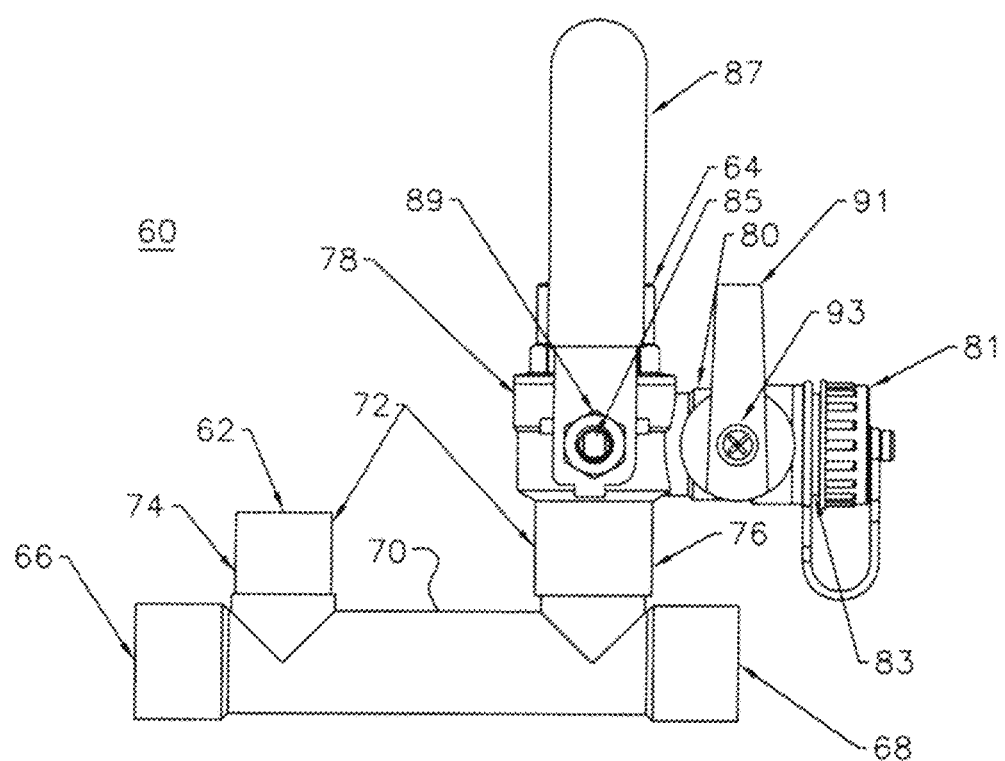
FIG. 10 shows an example of a purge valve.

FIG. 10 shows an example of a purge valve to which gauge adaptor apparatuses of the present disclosure can be connected. The purge valve includes a valve body 60 containing a first primary loop port 62, a second primary loop port 64, a first secondary loop port 66 and a second secondary loop port 68. The secondary loop ports 66, 68 are disposed at respective ends of a linear secondary loop portion 70 of the valve body 60. A primary loop portion 72 of the valve body 60 is formed by a pair of "closely" spaced tees 74, 76 extending from the secondary loop portion 70. At least one main valve portion 78 is disposed in at least one of the tees 76 between the secondary loop portion 70 and a primary loop port 64. A drain/venting valve portion 80 extends from the main valve portion 78. An end cap 81 is affixed to the valve body 60 at a drain port 83 of the drain/venting valve portion 80. To connect a gauge adaptor apparatus to the purge valve, end cap 81 is first removed. A portion of the secondary loop portion 70 between the tees 74, 76 is shared with the primary loop portion in which flow in a primary loop and a secondary loop are "hydraulically separated."

A main actuator 85 extends from the valve body 60 enabling a first and second position of the main valve portion 78. A main flow diversion device (not shown here) is connected to a main handle 87 via the main actuator 85. The main handle 87 is retained to the main actuator with a nut 89. A purge valve handle 91 is connected to a purge valve flow diversion device (not shown here) via a purge valve actuator (not shown here). The purge valve handle 91 is retained to the purge valve actuator by a screw 93.

Figure 11:
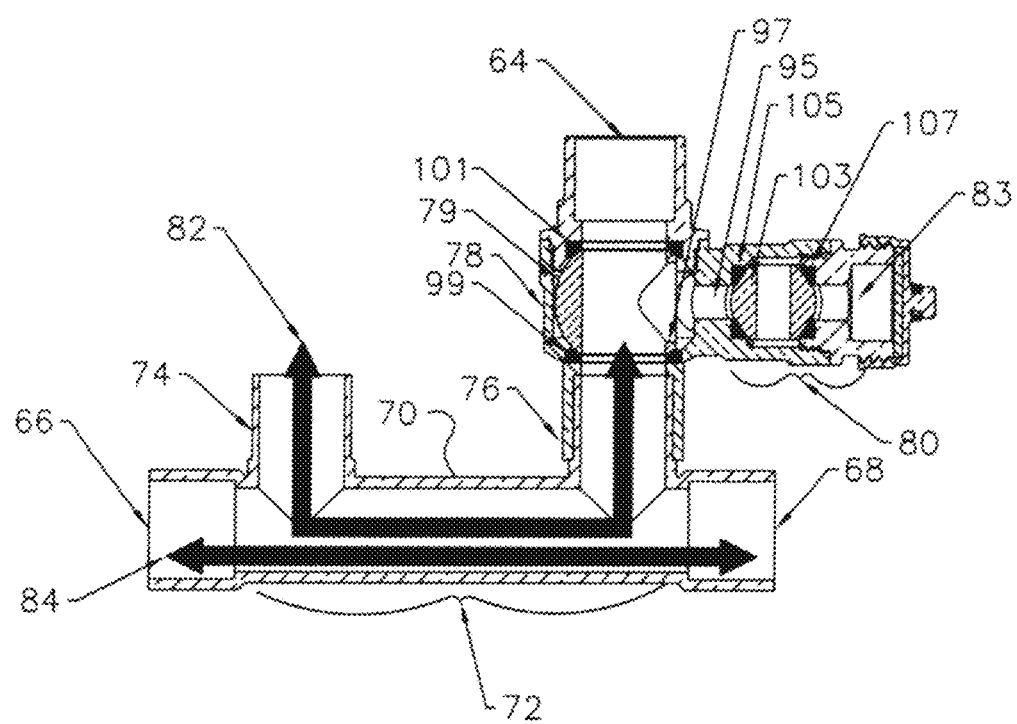
FIG. 11 shows a cross-section view of a purge valve.

FIG. 11 is a sectioned view of the purge valve of FIG. 10 in normal operating position prior to attachment of a gauge adaptor apparatus. The end cap 81 is in place and the purge valve flow diversion device 103 is in a position to prevent flow to the drain. A primary loop fluid flow path 82 is shown by arrows extending into tee 74, through the secondary loop portion 70 and into tee 76. Fluid can flow in either direction along the primary loop fluid flow path 82. A secondary loop flow path 84 is shown by arrows extending into the first secondary loop port 66 through the secondary loop portion 70 and out from the second secondary loop port 68. It should be understood that a common flow of both the primary loop flow path 82 and the secondary loop flow path 84 exists in the secondary loop portion 70.

The main valve portion 78 is shown in the normal operation position in which fluid in the primary fluid flow path 82 can flow from secondary loop portion 70 through the main valve portion 78 to the primary loop port 64. The main flow diversion device 79 in the main valve portion 78 is shown in a first position to enable flow in the primary flow path between tee 76 and the second primary loop port 64 while preventing flow to the drain/venting valve portion 80. In this illustrative embodiment, the main flow diversion device 79 is a first ball having a through hole 95 extending through its center and a blind hole 97 extending orthogonal to the through hole to its center. The first ball is rotatable on an axis of the main actuator 85 by movement of handle 87 (best seen in FIG. 10) and main actuator 85. The first ball forms a seal with sealing portions 99 and 101.

The purge valve flow diversion device 103 in the drain/venting valve portion 80 is shown in its normally closed position in which fluid in the primary flow path 82 is prevented from flowing between the main valve portion 78 and the drain port 83. In this illustrative embodiment, the purge valve flow diversion device 103 is a second ball having a through hole extending through its center. The second ball is rotatable on an axis of the purge valve actuator (not shown) which extends through its center and normal to the plane of drawing in FIG. 11 by movement of purge valve handle 91 (best seen in FIG. 10) and the purge valve actuator retained thereto (not shown) by screw 93. The second ball forms a seal with sealing portions 105 and 107.

Figure 12:
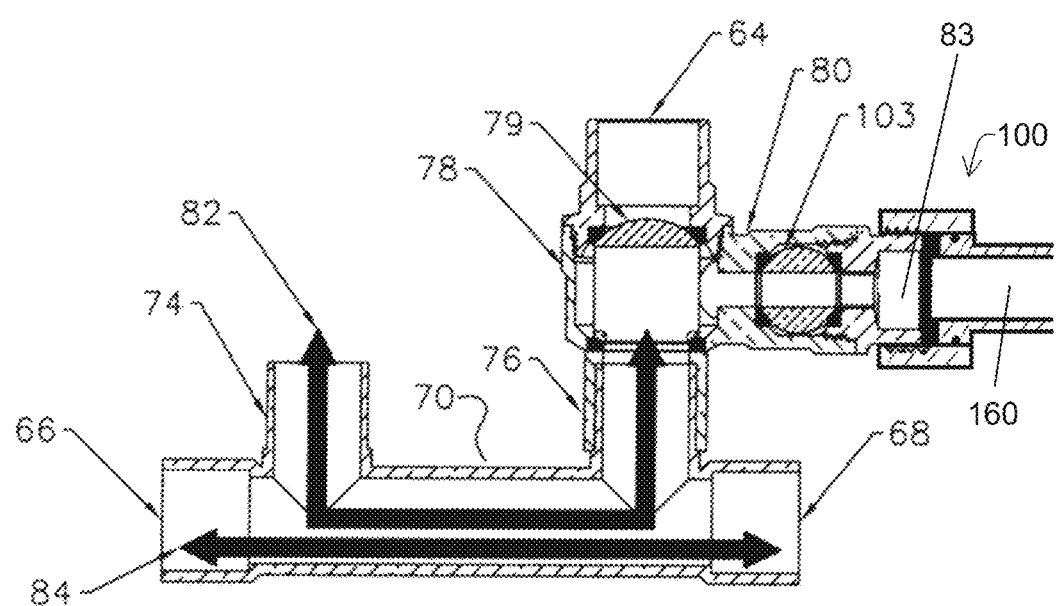
FIG. 12 shows a cross-section view of a purge valve with a gauge adaptor apparatus installed.

FIG. 12 is a section view of the primary/secondary loop purge valve in a purge/drain position and with a gauge adaptor apparatus 100 connected. The primary loop fluid flow path 82 is shown by arrows extending into tee 74, through the secondary loop portion 70 and into tee 76. Fluid in the primary flow path flows into main valve portion 78 where it is diverted by the main flow diversion device 79 into the drain/venting valve portion 80. Because the purge valve handle is in the purge/drain position, fluid entering the drain/venting valve portion 80 can flow through the purge valve flow diversion device 103 to the drain port 83 and to the gauge adaptor apparatus 100. Protective cap 81 has been removed.

While the apparatus 100 is in fluid communication with one of the flow paths, the gauge (not shown) can take a reading of the pressure inside the system. In an alternative embodiment, if a combination temperature and pressure gauge adaptor is connected, the gauge can take a temperature reading. In that embodiment, the temperature probe would extend down the flow channel 160 and through the drain port 83.

Gauge adaptor apparatuses of the present disclosure can also be used with isolation valves. Isolation valves are used in plumbing and heating applications to control the flow of water or other fluid to and from an in-line appliance or piece of equipment for purposes of maintenance, replacement or repair.

Figure 13:
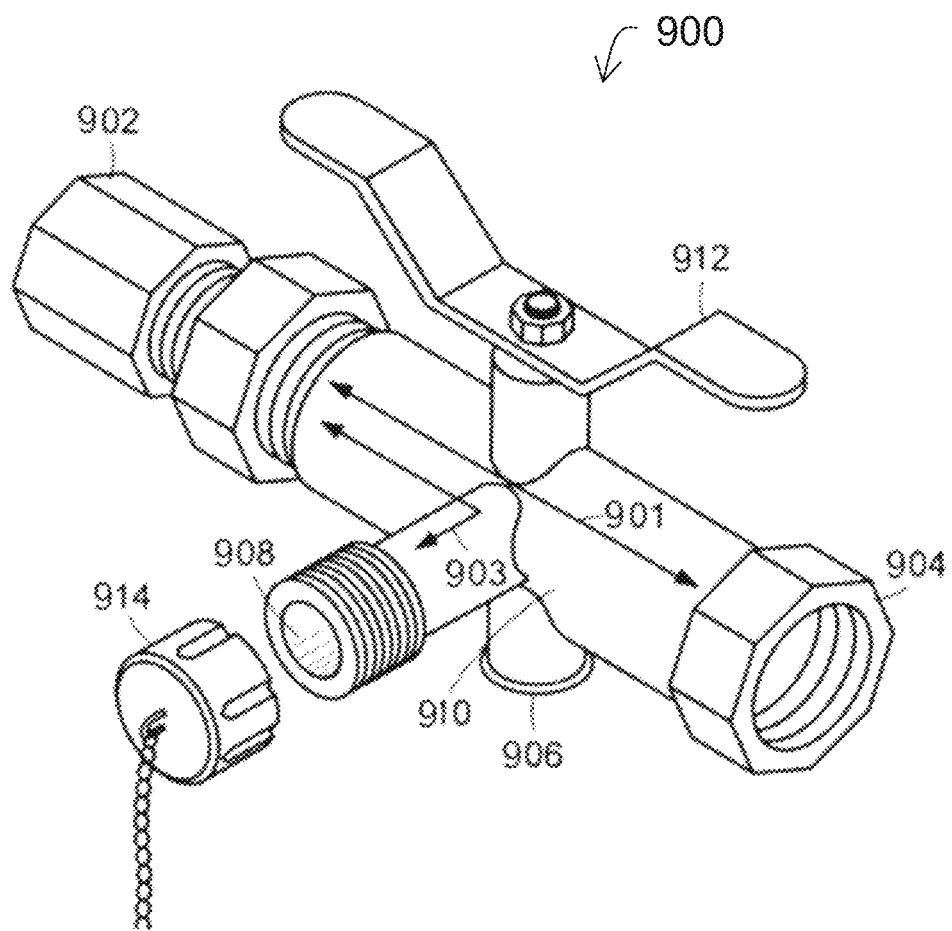
FIG. 13 shows a perspective view of a hot water isolation valve.

Referring to FIG. 13, a hot water isolation valve 900 is shown and includes a first hot water port 902, a second hot water port 904, a hot water relief port 906 and a hot water drain port 908. Hot water isolation valve 900 defines a hot water flow channel 901 and a hot water drain channel 903. The hot water flow channel 901 provides fluid communication between the first hot water port 902 and the second hot water port 904. The hot water drain channel 903 provides fluid communication between the first hot water port 902 and the hot water drain port 908. The hot water isolation valve 900 includes a flow diversion device (not shown), such as a ball valve, disposed within a valve portion 910 disposed between first hot water port 902, second hot water port 904, hot water relief port 906 and hot water drain port 908. Moreover, the flow diversion device is configurable between a first configuration and a second configuration via a flow adjustment means 912, such as a butterfly handle. In FIG. 12, the flow diversion device is shown in a first configuration wherein hot water flow is between first hot water port 902 and second hot water port 904. No water flows to the drain port 908 in this configuration. A drain cap 914 is shown removed from the drain port 908.

Figure 14:
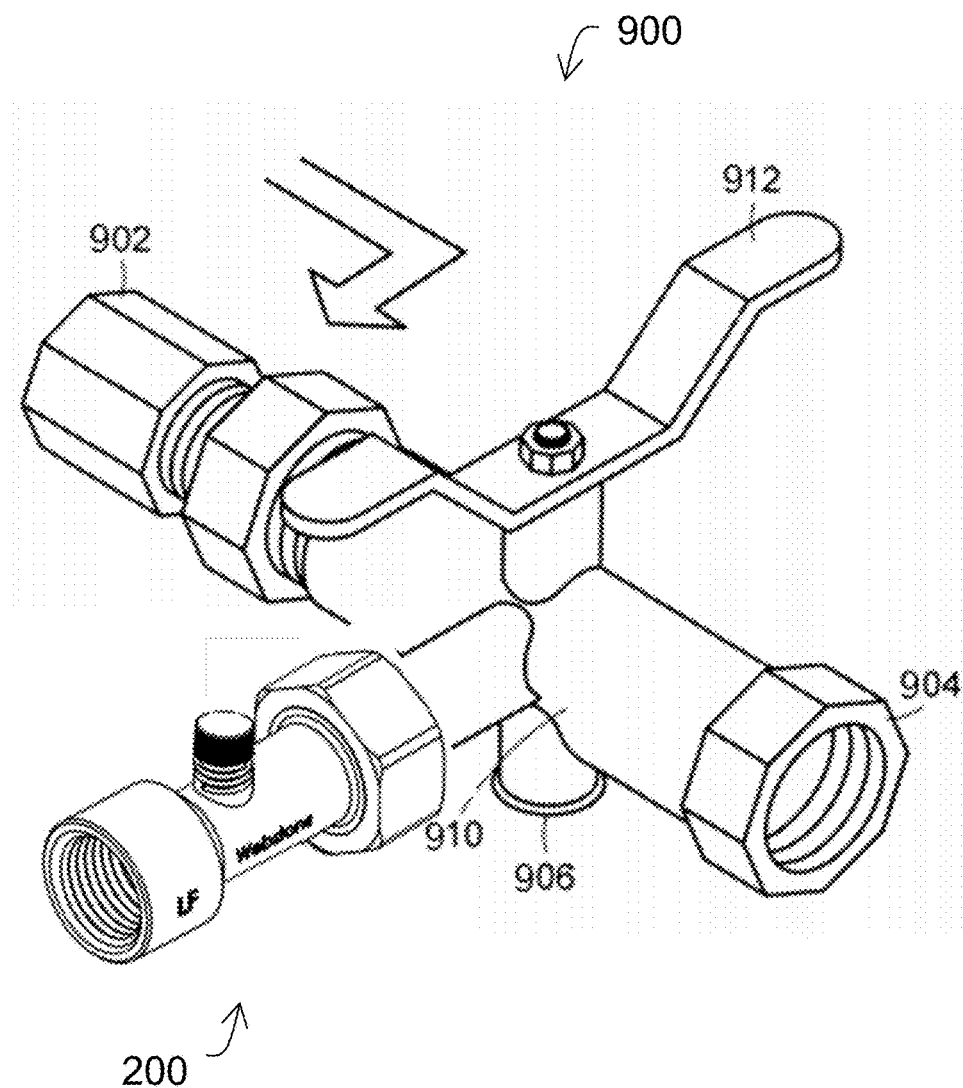
FIG. 14 shows a perspective view of a hot water isolation valve with a gauge adaptor apparatus installed.

In FIG. 14, the flow diversion device is shown in a second configuration wherein hot water flow is between first hot water port 902 and hot water drain port 908. The flow adjustment means 912 is turned 90 degrees from the configuration shown in FIG. 13, directing the flow to the drain port 908. It should be noted that hot water relief port 906 includes a threaded portion (female) for receiving a hot water relief valve. However, although hot water relief port 106 is shown having a threaded (female) portion, it should be appreciated that hot water relief port 106 may be configured for connecting with a hot water relief valve in any manner suitable to the desired end purpose, such as a threaded portion (male), a friction fit connector, a crimped connector, a clamped connector, a quick disconnect connector, or the like.

As shown in FIG. 14, a gauge adaptor apparatus 200 of the present invention is connected to drain port 908. The flow channel of the apparatus 200 is in fluid communication with the water flow of the system. The apparatus is shown with the gauge removed, but it is to be understood that any gauge of the present disclosure, such as a pressure gauge, a temperature gauge, or a combination pressure and temperature gauge could be connected to the gauge fitting.

To attach the apparatus 200, the drain cap 914 is removed and the union fitting of the apparatus 200 is threaded onto the drain port 908 until the washer (not shown) creates a seal between the body of the apparatus 200 and the drain port 908. The flow adjustment means 912 is turned to redirect flow towards the drain port 908 and into the apparatus 200, thereby incorporating apparatus 200 into the system and pressurizing it. The gauge (not shown) would then show a reading of the pressure inside the system. If the gauge included a temperature probe, it could also provide a temperature reading.

The apparatus could be left in place to provide a permanent means of pressure and/or temperature readings, or it could be removed again if only a one-time reading is desired. To remove it, the flow adjustment means 912 is turned again to stop flow to the apparatus 200. The bleeder is then turned to relieve the pressure built up in the flow channel. Once the pressure is released, the union nut can be safely twisted off to remove the apparatus.

Figure 15:
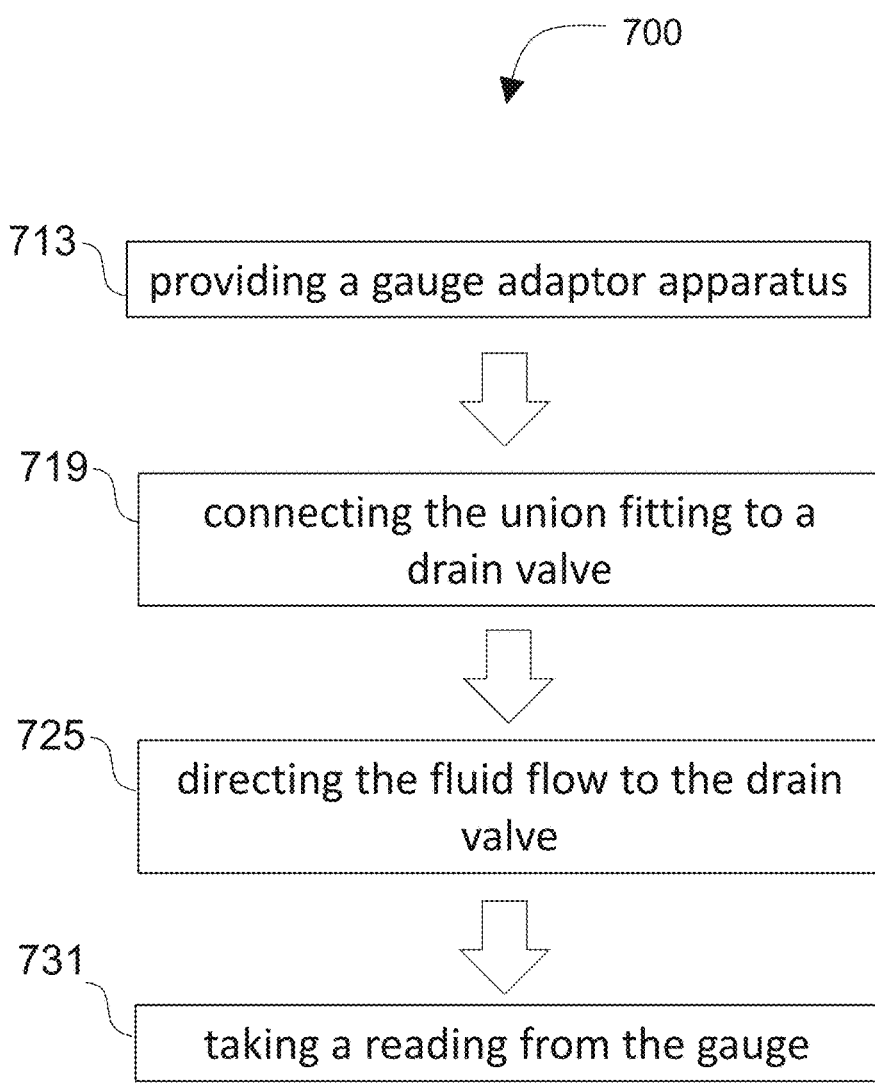
FIG. 15 shows a method for taking a gauge reading from a hydronic system.

Certain aspects of the invention involve a method for taking a gauge reading from a hydronic system. FIG. 15 shows generally the steps of the method 700. A gauge adaptor apparatus is provided 713. The apparatus has a flow channel running therethrough and is provided with a fitting at one end of the flow channel connectable to a drain valve of a hydronic system. The gauge adaptor apparatus includes another fitting for connecting to a gauge, also in fluid communication with the flow channel. The gauge can be a pressure gauge, a temperature gauge, or a combination pressure and temperature gauge. The gauge adaptor apparatus also includes a bleeder valve in fluid communication with the flow channel. The bleeder valve is operable to relieve pressure from the flow channel.

The method 700 further involves connecting 719 the union fitting of the apparatus to a drain valve of a hydronic system. The drain valve may include a drain cap, which is removed prior to connection with the gauge adaptor apparatus. The drain valve is operably connected to a flow control device, such as a ball valve, which controls fluid flow to the drain valve. While the flow control device is in a first position preventing flow to the drain valve, the gauge adaptor apparatus can be connected to the drain valve.

Once connected, the flow control device can be moved to a second position, thereby directing 725 fluid the flow to the drain valve and thereby to the gauge adaptor apparatus, thus incorporating the gauge adaptor apparatus into the system. The method 700 further involves taking 731 a reading from the gauge. The reading may be a pressure reading, a temperature reading, or both.

In embodiments of the method 700, the gauge adaptor apparatus is then disconnected from the system. The flow diversion device is reoriented to its first position to once again block flow to the drain valve, effectively removing the gauge adaptor apparatus from the hydronic system. The bleeder is actuated to release residual pressure inside the gauge adaptor apparatus and return pressure to ambient pressure at which it is safe to remove the apparatus. The gauge adaptor apparatus is then disconnected from the drain valve.

INCORPORATION BY REFERENCE

Any and all references and citations to other documents, such as patents, patent applications, patent publications, journals, books, papers, web contents, have been made throughout this disclosure are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

What is claimed is:

1. A method for taking a reading from a hydronic system, the method comprising:
    providing a gauge adaptor apparatus comprising: a body defining a flow channel; a union fitting at one end of the flow channel connectable to a drain valve of a hydronic system; a bleeder valve opening formed in said body in fluid communication with the flow channel; a gauge fitting formed in said body in fluid communication with the flow channel; and a gauge connected to the gauge fitting;
    connecting the union fitting to a drain valve of a hydronic system having a fluid flow;
    directing the fluid flow to the drain valve to incorporate the gauge adaptor apparatus into the hydronic system; and
    taking a reading from the gauge.

2. The method of claim 1, wherein the union fitting comprises a ¾" threaded female union fitting.

3. The method of claim 1, wherein the union fitting further comprises a gasket, o-ring, or washer for creating a seal between the body and the drain valve.

4. The method of claim 1, wherein the bleeder valve comprises a bleeder cap and a gasket, o-ring, or washer for creating a seal between the body and the bleeder cap.

5. The method of claim 1, wherein the gauge comprises a pressure gauge and the reading comprises a pressure reading.

6. The method of claim 5, wherein the gauge further comprises a temperature gauge and the reading further comprises a temperature reading.

7. The method of claim 6, wherein the gauge further comprises a temperature probe configured to fit inside the flow channel.

8. The method of claim 1, further comprising removing the gauge adaptor apparatus from the hydronic system by:
    diverting fluid flow from the drain valve;
    using the bleeder to bleed fluid from the flow channel; and
    disconnecting the union fitting from the drain valve.

* * * * *